Figure 1:
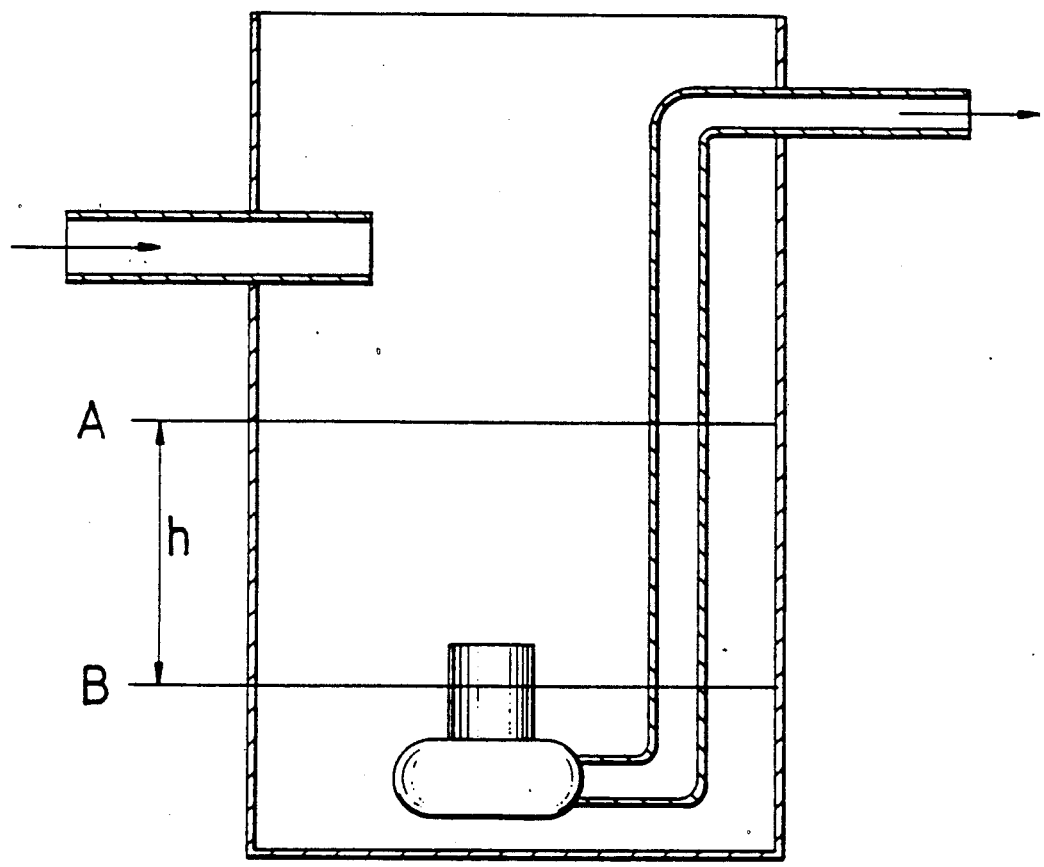

United States Patent [19]  
Palmu et al.

[11] Patent Number: 4,999,117  
[45] Date of Patent: Mar. 12, 1991

[54] MONITORING METHOD FOR WASTEWATER PUMP STATION AND COMPATIBLE APPARATUS

[75] Inventors: Jukka Palmu; Eero Oinonen, both of Vantaa; Leo Numminen, Kaunianen; Jyrki Tolvanen, Helsinki; Martti Varis, Espoo, all of Finland

[73] Assignee: Oy E. Sarlin AB, Helsinki, Finland

[21] Appl. No.: 361,313

[22] Filed: Jun. 5, 1989

[30] Foreign Application Priority Data

Jun. 8, 1988 [FI] Finland ................. 882711

[51] Int. Cl.$^5$ ............... F04B 49/10; G08B 21/00
[52] U.S. Cl. ................. 210/744; 137/558; 340/606; 364/510; 417/12; 417/36
[58] Field of Search ............... 210/86, 87, 89, 104, 210/416.1, 739, 744, 143; 417/9, 12, 18, 19, 20, 22, 53, 63, 1, 36, 40; 137/558; 340/618, 606; 364/510

[56] References Cited

U.S. PATENT DOCUMENTS

| 3,073,244 | 1/1963 | Elliot et al. | 340/242 |
|---|---|---|---|
| 3,610,779 | 10/1971 | Hubby | 73/151 |
| 3,664,916 | 2/1972 | Payne, Sr. | 417/63 |
| 3,723,987 | 3/1973 | Barone, Jr. et al. | 340/242 |
| 3,739,366 | 6/1973 | Lace | 340/239 R |
| 4,090,179 | 5/1978 | Hirano | 340/202 |
| 4,108,574 | 8/1978 | Bartley et al. | 417/19 |
| 4,204,801 | 5/1980 | Kamo | 417/36 |
| 4,313,824 | 2/1982 | Huss et al. | 210/86 |
| 4,341,178 | 7/1982 | Price | 114/183 R |
| 4,437,811 | 3/1984 | Iwata et al. | 417/36 |
| 4,444,545 | 4/1984 | Sanders et al. | 417/40 |
| 4,529,359 | 7/1985 | Sloan | 417/40 |
| 4,543,570 | 5/1983 | Bressent et al. | 340/589 |
| 4,631,530 | 12/1986 | Gasper | 210/739 |
| 4,663,613 | 5/1987 | Raleigh et al. | 340/607 |
| 4,805,118 | 2/1989 | Rishel | 417/20 |

FOREIGN PATENT DOCUMENTS

| 2928936 | 1/1981 | Fed. Rep. of Germany | 340/618 |
|---|---|---|---|
| 54-149903 | 11/1979 | Japan | 417/1 |
| 60-150491 | 8/1985 | Japan | 417/9 |
| 61-049180 | 3/1986 | Japan | 417/63 |
| 61-152979 | 7/1986 | Japan | 417/19 |
| 2139793 | 11/1984 | United Kingdom | 417/9 |
| 2162979 | 2/1986 | United Kingdom | 137/557 |
| 2193361 | 7/1986 | United Kingdom | 137/558 |

Primary Examiner—Robert A. Dawson  
Assistant Examiner—Joseph Drodge

[57] ABSTRACT

A monitoring method for wastewater pump station performance and output, which method is capable of detecting an operating malfunction of the wastewater pump station such as a clog or leak within the pump, piping network or valves, or an output reduction due to pump wear. A monitoring apparatus placed at the wastewater pump staion performs continual monitoring of pump output values based on rates of rise of liquid level during pump non-run periods, time periods for the pump to reduce levels and resulting volume changes and at a controlled moment compares the values with measured reference values.

6 Claims, 2 Drawing Sheets

MONITORING METHOD FOR WASTEWATER PUMP STATION AND COMPATIBLE APPARATUS

The present invention concerns a monitoring method for the supervision of wastewater pump station performance and output, which method is capable of detecting an operating malfunction of the wastewater pump station such as a clog or leak within the pump, piping network or valves, or an output reduction due to pump wear.

Conventionally any malfunction such as a clog, piping network leakage or an output reduction due to pump wear at the wastewater pump station is detected only when the pump station loses its operating capability allowing the liquid level at the wastewater pump station to reach an alarm limit, whereby an immediate corrective action must be initiated at the pump station or alternatively, for instance, a partial clog or pump output reduction due to wear creates a malfunction that can be detected only through extended monitoring of pump operating time and duty ratio.

The method in accordance with the invention aims to detect wastewater pump station malfunctions and reduced output at an earlier stage, thereby allowing the corrective action to be initiated before a malfunction causes serious damage to the process served by the wastewater pump station.

The method in accordance with the invention is characterized by using a compatible monitoring apparatus, placed at the wastewater pump station, for continual monitoring of pump output flow volume values and the comparing of these values with set output values. Thereby, with the help of the invention, an immediate alarm can be issued if output flow volume values at the wastewater pump station change for any reason, thus allowing preventative maintenance operations to be initiated.

One advantageous implementation of the invention is characterized by measuring pump output flow volume values through flow measurements taken at the pressurized piping network.

A second implementation of the invention is characterized by detecting the liquid level rate-of-rise caused by the inlet flow, liquid level height and pumping time for the determination of pump output values.

A third implementation of the invention is characterized by defining pump output values from the measured liquid level rate-of-rise and pumping time required to alter the liquid level from one set level to another set level. If large variations occur in the inlet flow to the pump station thereby influencing the pumping time, this is taken into account by performing the comparative measurement only at such instances at which the inlet flow is at the same level as that used for defining the set reference values.

The invention also concerns a monitoring apparatus, capable of implementing the aforementioned monitoring method. The monitoring apparatus in accordance with the invention is characterized by incorporating conventional flow meters and limit sensors complemented with an alarm unit, which issues an alarm when set limit values are violated. This arrangement provides for a fully automatic alarm system, which is based on continually performed monitoring measurements against reference values and is sensitive to wastewater pump station malfunctions, to be implemented with the help of simple devices and a programmable logic controller with memory.

In the following, the invention will be examined in more detail by means of an exemplifying embodiment with reference to the attached drawings, in which FIG. 1 shows diagrammatically a pump station in accordance with the invention in a longitudinal cross section.

Figure 2:
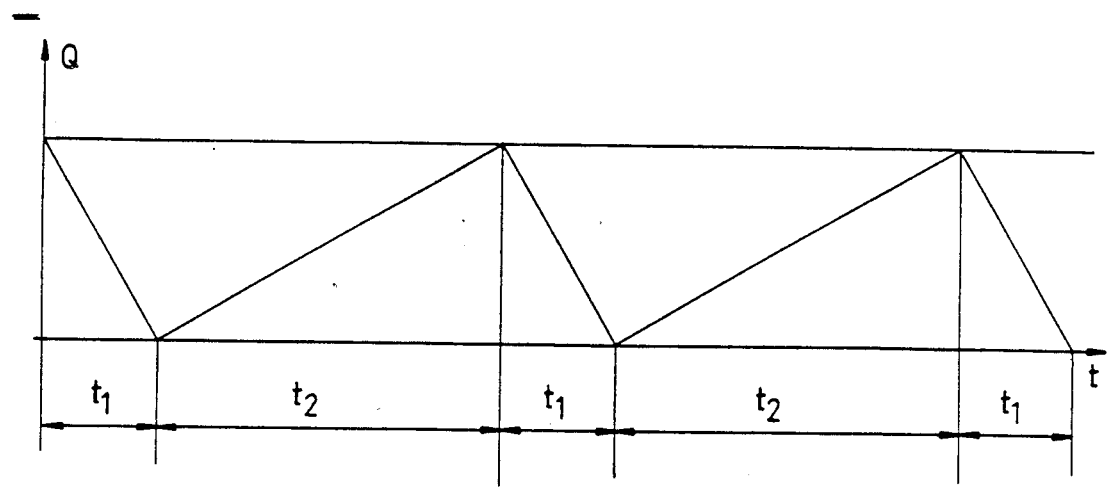

FIG. 2 shows a flow volume graph as a function of time.

The monitoring method for wastewater pump station malfunctions is capable of detecting an operating malfunction of the wastewater pump station such as a clog or leak within the pump, piping network or valves, or an output reduction due to pump wear A monitoring apparatus placed at the wastewater pump station performs continual monitoring of pump output values and at a controlled moment compares the values with measured reference values. The height differential h shown in FIG. 1 indicates the upper (A) and lower (B) reference limits. Limit A could be, for instance, the start limit, while limit B would then be an appropriate stop limit for the pump, or alternatively, one or both of these limits could be arbitrary height limits, provided, however, that both of these limits are activated during the run sequence of the pump. Pump output is measured approximately by detecting the time required for the pump to run until the liquid level falls from the reference limit A to reference limit B, while the effect of inflow is taken into account therein that the time required for the liquid level to rise from level B to level A during a pump no-run period is detected, in which approach the assumption is made that inflow will stay approximately constant during the no-run period of the pump. The pumped volume A→B is selected sufficiently small to correspond to, e.g., a run period of 20 s ... 6 min for the pump in said conditions.

In order to most effectively minimize the influence of inflow variations, the reference measurement is performed after such a no-run period that has a minimum inflow rate, which maximally may not exceed 20% of the output of a new pump in said conditions. This means that said measurement is performed only in conditions where the no-run period of the pump is at least fivefold compared with time required for a new pump to pump the volume A→B.

Hence, if we denote:

$\dot{V}_2$ = inflow,
$\dot{V}_{1pu}$ = the flow rate of a new pump in said conditions (at prevailing head) is denoted,
V = volume change from A→B,
$t_1$ = time required for a worn pump to reduce liquid level A→B, and
$\dot{V}_{1p}$ = flow rate of a worn pump, then $$\dot{V}_{1p} \cdot t_1 = V + \dot{V}_2 \cdot t_1$$

and solving $$\dot{V}_{1p} = \frac{V + \dot{V}_2 \cdot t_1}{t_1}$$

where V is known from the geometric volume data of the pump station, $t_1$ is measured, $\dot{V}_2$ is measured (approximately) by detecting the time $t_2$, required for the liquid level to rise from level B to level A during the preceding no-run period of the pump. We solve $$\dot{V}_2 = V/t_2$$

The evaluation of the condition of the worn pump is now accomplished by comparing the computed flow rate $\dot{V}_{1p}$ of the worn pump to the flow rate $\dot{V}_{1pu}$ recorded from the factory test runs of the pump, from published data, or from test runs of the pump at the station when new.

If the deviation of the flow rates between the new and worn condition of the pump exceeds a set maximum value, this indicates a worsened level of pump performance. The novelty of the invention is appreciated in the possibility of using this measurement method in the implementation of an automated measurement sequence with the help of commercially available, cost-effective and uncomplicated programmable logic controllers or similar equipment. The measurement and subsequent comparison with the performance data of a new pump can be stored into the program memory of the logic controller, in order to automate the measurements into a sequence repeating at set intervals, which, however, may be irregular (due to changes in the inflow) but in practice anyway repeating at least at intervals not longer than a few days.

FIG. 2 illustrates in a graph form the pumping sequence, where the pump-on time is marked as $t_1$ and pump station fill-in time as $t_2$. Depending on the inlet flow, the fill-in time $t_2$ can vary.

The above description dealt only with the case in which the no-run period was defined as $$t_2 \geqq X * \frac{V}{\dot{V}_{1pu}}$$

If we additionally define the measurement to be activated only when the no-run period fulfills the condition:

$$X * \frac{V}{\dot{V}_{1pu}} \leqq t_2 \leqq Y * \frac{V}{\dot{V}_{1pu}},$$

then the measurement takes place automatically always when the no-run period falls between these limits, whereby X and Y are coefficient whose values are determined according to pump system configuration.

The coefficient Y is selected to be, e.g., 7 if X=5. By setting a lower and upper limit for the no-run period $t_2$, which triggers the measurement, a further reduction in the uncertainty of measurement is achieved.

In order to ensure that the interval between the measurements does not grow untolerably long, a counter in the logic controller can be programmed to accumulate the number of performed measurements. Then, at desired intervals, e.g., each month, the counter contents can be read to check the rate of measurements. If the accumulated number is unacceptably low, the coefficients X and Y can be adjusted accordingly.

The logic controller can be programmed to issue an alarm, either visually or acoustically or in electrical form to a remote-control network, if the pump performance falls below a set minimum level. In the case when no alarms are desirable, measurement data can be stored in the controller, memory to be read later by a service technician in conjunction with a service call.

What is claimed is:

1. A method of monitoring a wastewater pump station performance and output by a monitoring apparatus, wherein said station includes a pump having a run sequence of alternating run and non-run periods, the method comprising the steps of:
    determining the time required for the pump to alter a liquid level of said station from a first higher level to a second lower level;
    determining the change of volume in said station between said first and second levels;
    determining the liquid level rate-of-rise caused by inlet flow into said station during a non-run period of said pump;
    determining an output value for said pump from said determined time, determined volume, and said determined rate-of-rise;
    comparing said determined output value with a reference output value to obtain a deviation; and
    taking corrective action at said station in response to said deviation.

2. A method as claimed in claim 1, including selecting said reference output value from a set of reference output values having corresponding rates of rise.

3. A method as claimed in claim 2, including:
    determining time required for a pump having said reference output value to pump said determined volume;
    determining a non-run time of said pump; and
    performing said comparing step whenever said determined non-run time is fivefold said determined time required.

4. A method as claimed in claim 3, wherein said comparing step is performed whenever said determined non-run time is between two limit values.

5. A method as claimed in claim 1, including:
    determining time required for a pump having said reference output value to pump said determined volume;
    determining non-run time of said pump; and
    performing said comparing step whenever said determined non-run time is fivefold said determined time required.

6. A method as claimed in claim 1,
    including determining non-run time of said pump; and
    wherein said comparing step is performed whenever said determined non-run time is between two limit values.

* * * * *